Figure 1:
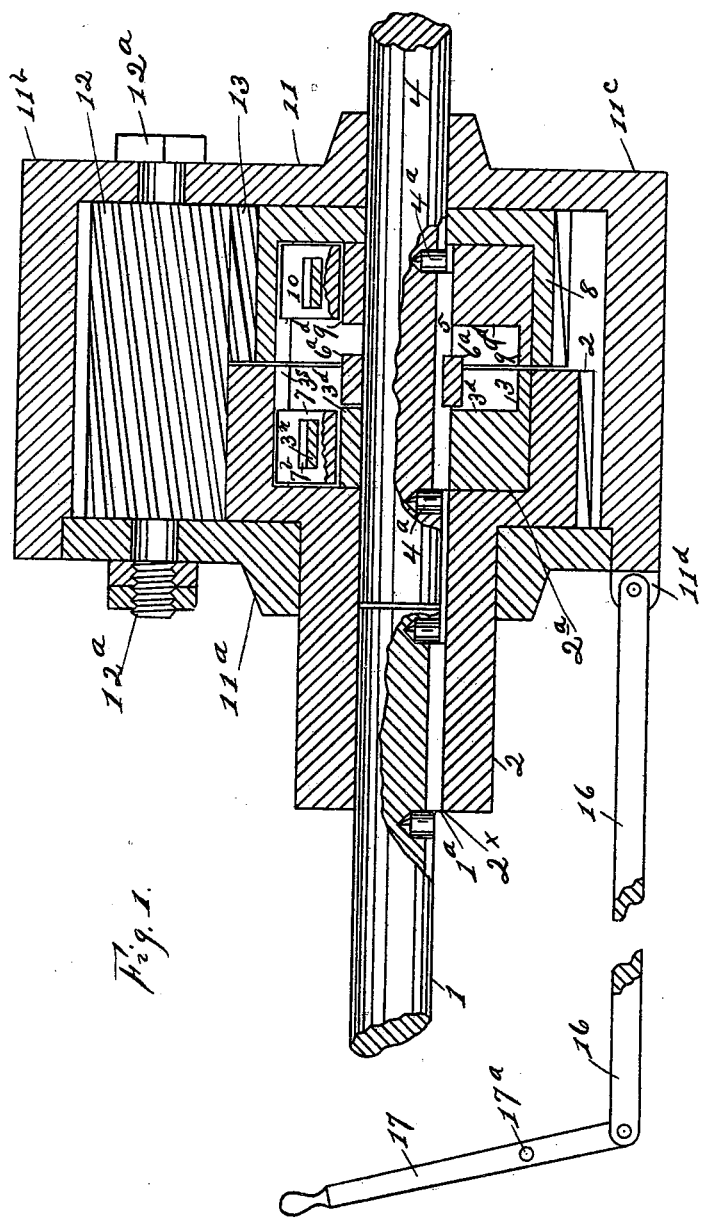

No. 644,508. Patented Feb. 27, 1900.
F. A. ERRINGTON.
PROPELLER REVERSE GEAR.
(Application filed Aug. 27, 1897.)
(No Model.) 2 Sheets—Sheet 1.

Witnesses: Inventor

No. 644,508. Patented Feb. 27, 1900.
F. A. ERRINGTON.
PROPELLER REVERSE GEAR.
(Application filed Aug. 27, 1897.)
(No Model.) 2 Sheets—Sheet 2.
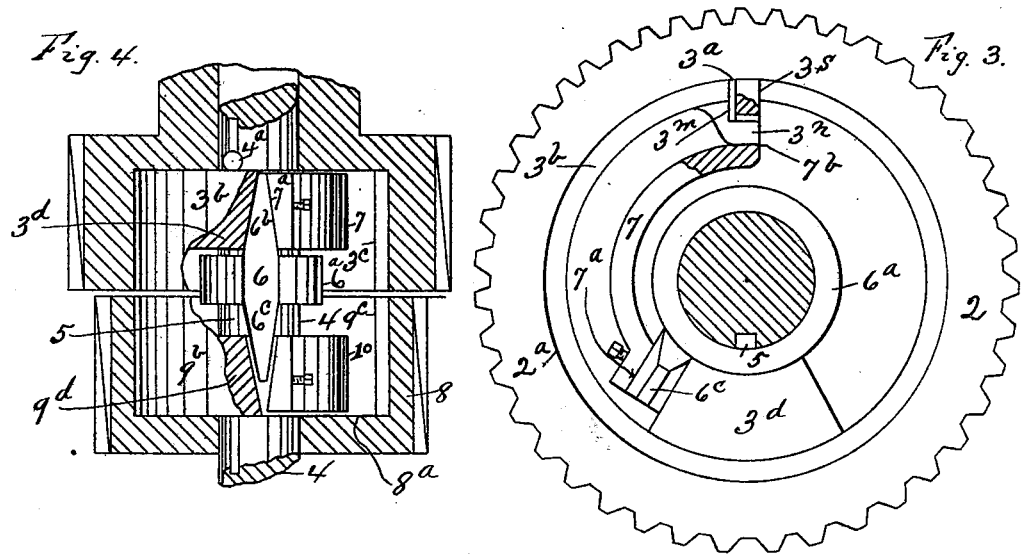
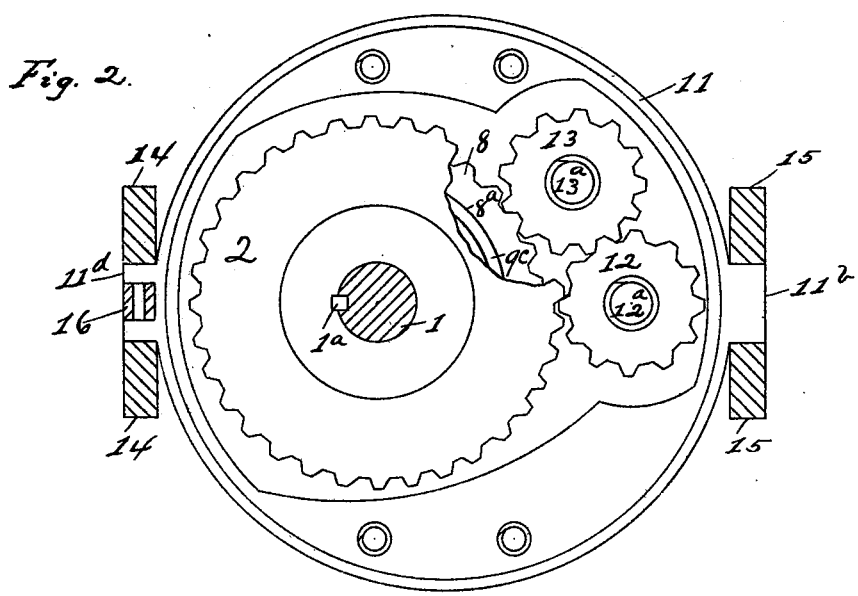
Witnesses: Inventor

United States Patent Office.

FRANKLIN A. ERRINGTON, OF NEW YORK, N. Y.

PROPELLER REVERSE-GEAR.

SPECIFICATION forming part of Letters Patent No. 644,508, dated February 27, 1900.

Application filed August 27, 1897. Serial No. 649,741. (No model.)

*To all whom it may concern:*

Be it known that I, FRANKLIN ALFRED ERRINGTON, a citizen of the United States, residing in New York, (Stapleton,) Richmond county, New York, have invented certain new and useful Improvements in Propeller-Reversing Gears, of which the following is a specification.

My invention relates, broadly, to means for connecting a propeller-shaft or the like with a rotative driving part, and more particularly to a friction reversing-gear by means of which said propeller-shaft may be gradually connected with said rotative part and locked in rotary engagement by a wedge-lever mechanism, and other details of improvements and combinations of parts hereinafter described, illustrated in the accompanying drawings, and then pointed out in the claims.

Reference is to be had to the accompanying drawings, forming part hereof, wherein—

Figure 1 is a horizontal cross-section of a device embodying my invention. Fig. 2 is a broken plan view of Fig. 1 with the cover removed, showing the coaction of the gear-train. Fig. 3 is a view of the inner face of one of the wheels, showing an end view of the wedge-lever friction mechanism. Fig. 4 is a partly-broken side view of the wedge-lever friction mechanism.

A driving-gear wheel 2 is connected to rotate with and to slide upon an engine-shaft 1 by a spline $1^a$, meshing with a groove $2^x$. The inner face of wheel 2 is recessed to provide an axial clutch-chamber $2^a$ within the plane of said inner face to receive a friction-wheel 3, the periphery of said friction-wheel 3 forming a friction-band split by a slot $3^a$ into two sections $3^b$ $3^c$ to permit said friction-band to be expanded against the side walls of clutch-chamber $2^a$. A propeller-shaft 4 is shown axially socketed in wheel 2, and the friction-band $3^b$ $3^c$ is connected to said shaft 4 by an arm $3^d$, which is provided with a bore located axially to the periphery of wheel 3. The propeller-shaft 4 is grooved to receive a spline 5, said spline being preferably held from longitudinal movement along shaft 4 by pins $4^a$. The middle portion of spline 5 is cut down level with the periphery of shaft 4 to receive a collar $6^a$ of a wedge 6, by which construction said collar is held from end movement upon shaft 4. One side of one end $6^b$ of wedge 6 rests against arm $3^d$, and the other side of end $6^b$ engages the point of application $7^a$ of a lever 7. One section $3^b$ of the friction-band is provided with a fulcrum $3^m$, having a supporting-step $3^n$, which meshes with an aperture $7^b$ in lever 7 and supports said lever 7 in operative position in slot $3^a$, and the other section $3^c$ of the friction-band is provided with a resistance-face $3^s$. By this construction the advance of the end $6^b$ of wedge 6 between the lever 7 and arm $3^d$ forces the fulcrum $3^m$ away from the resistance-face $3^s$ to expand the friction-band $3^b$ $3^c$ against the side walls of clutch-chamber $2^a$ to connect the shaft 4 with wheel 2 and shaft 1.

A reversing-wheel 8 surrounds the propeller-shaft 4 and is provided with a clutch-chamber $8^a$, a friction-wheel 9, having an arm $9^d$, and a lever 10, the friction-wheels 3 and 9 being both splined to turn with and slide upon shaft 4 and the other end $6^c$ of wedge 6 being adapted to expand friction-band $9^b$ $9^c$ against the side walls of clutch-chamber $8^a$ in a similar manner to that above explained to connect the shaft 4 with reversing-wheel 8.

The peripheries of wheels 2 8 are preferably provided with spiral gear-teeth to secure maximum strength and smooth running. A cover $11^a$ surrounds hub of wheel 2, and a case 11 incloses wheels 2 8 and is attached to cover $11^a$. Bolts $12^a$ $13^a$ pass through said case 11 and cover $11^a$. A double-depth transmitting-pinion 12 is journaled upon bolt $12^a$ and meshes with driving-wheel 2. A reversing-pinion 13 is journaled upon bolt $13^a$ and meshes with the reversing-wheel 8 and also with transmitting-pinion 12. The use of spiral gear-teeth is particularly desirable to give as many wheel-teeth in mesh with the pinion-teeth as possible with pinions of minimum diameter. The case 11 is shown provided with lugs $11^b$ $11^c$ to mesh with slide-blocks 14 15. An eye $11^d$ is provided to afford connection of case 11 with a connecting-rod 16, which is operated by a lever 17, fulcrumed upon a pin $17^a$ to move said case 11 along the shafts 1 4 to operate the friction wedge-lever mechanism to connect the shaft 4 with either the driving or reversing wheel.

It will be seen that the recessed clutch-chambers 2ª 8ª enable the internal parts of the device to hold themselves from end movement with relation to the case 11 11ª. By the above construction the case 11 will be non-rotative, and the rotation of wheel 2 in one direction will rotate the wheel 8 in the opposite direction through the medium of pinions 12 13, and all the parts inclosed in case 11 11ª will be longitudinally movable upon the shaft 4 with the exception of spline 5 and wedge 6.

The operation of the parts is as follows: When it is desired to rotate the propeller-shaft 4 in one direction, as to the right, (or ahead,) the case 11 is moved back by means of lever 17 to force the end 6ᵇ of wedge 6 between the arm 3ᵈ and the point of application 7ª of lever 7, and the propeller-shaft 4 will thereby be connected to rotate with shaft 1 through the medium of wheels 2 3. When it is desired to stop the propeller-shaft 4 without stopping the engine-shaft 1, the case 11 is moved forward sufficiently to relieve the frictional contact of wheels 2 3. To rotate the propeller-shaft 4 in the opposite direction to engine-shaft 1, the case 11 is moved forward to force the end 6ᶜ between the arm 9ᵈ and lever 10, which connects the shaft 4 with wheel 8, which is continuously rotated in the opposite direction to wheel 2 and shaft 1, as aforesaid.

Having now described my invention, what I claim is—

1. The combination of a shaft, a wheel rotatable and longitudinally movable independently thereof, clutch mechanism connected to rotate with said shaft and longitudinally movable with said wheel, and a projection held from longitudinal movement with relation to said shaft and adapted to engage and operate said clutch mechanism to connect said wheel to rotate in unison with said shaft, substantially as described.

2. The combination of a shaft, a wheel rotatable and longitudinally movable independently thereof, a split friction-band connected to rotate with said shaft and independently movable therealong, a lever mechanism to cause said friction-band to engage said wheel, a wedge, and means to hold said wedge from longitudinal movement with relation to said shaft to enable said wedge to operate said lever, substantially as described.

3. The combination of a shaft, a wheel mounted concentrically therewith and movable independently thereof, a friction-band split by a slot into sections, one of said sections providing a fulcrum and the other thereof a resistance-face to receive pressure, a lever having one of its ends located in said slot, an arm connected to rotate with said shaft and with said friction-band, an eccentrically-located wedge, and means to move certain of said parts longitudinally to force said wedge between said arm and said lever to cause said friction-band to engage said wheel, substantially as described.

4. The combination of a shaft, a wheel rotatable thereon, a friction-band split by a slot into sections, a lever having one of its ends located in said slot, an arm connected to rotate with said shaft and with said friction-band, a wedge, means to hold said wedge from longitudinal movement with relation to said shaft, and means to move said wheel, friction-band, arm and lever along said shaft to force said wedge between said arm and said lever, substantially as described.

5. The combination of a shaft, a longitudinally-movable reverse mechanism mounted thereon, a lever friction mechanism movable with said reverse mechanism, and a wedge held from longitudinal movement with relation to said shaft and adapted to operate said lever friction mechanism to connect said shaft with said reverse mechanism, substantially as described.

6. The combination of two wheels, one of said wheels having a clutch-chamber in its inner face, a friction-band located in said clutch-chamber, a shaft connected with said friction-band and along which said wheels and friction-band are longitudinally movable, means to expand said friction-band against the side walls of said clutch-chamber, means to connect said shaft with the other of said wheels, and means to rotate one of said wheels in the opposite direction to the other thereof, substantially as described.

7. The combination of two wheels, one of said wheels having a clutch-chamber in its inner face, a shaft, clutch mechanism to connect said shaft with said wheels, each of said wheels having spiral gear-teeth upon its periphery, a case carrying gearing adapted to mesh with said wheels and transmit and reverse motion from one to the other thereof, and means to move said case longitudinally with relation to said shaft, substantially as described.

8. The combination of a shaft, two gear-wheels journaled in a case carrying gearing adapted to transmit and reverse motion from one to the other of said gear-wheels, said case and gear-wheels being longitudinally movable with relation to said shaft, each of said wheels having a clutch-chamber in its inner face, a split friction-band located in each of said clutch-chambers, each of said friction-bands being longitudinally movable along said shaft and connected to rotate therewith and provided with a lever to expand it against the side walls of its respective clutch-chamber, a double-ended wedge adapted to operate said levers alternately, and means to hold said wedge from longitudinal movement with relation to said shaft, substantially as described.

9. The combination of a shaft, a driving-wheel and a reversing-wheel having gear-teeth upon their peripheries, the axes of said wheels being concentric with the axis of said shaft, a case carrying a double-depth transmitting-pinion and a reversing-pinion, said transmitting-pinion meshing with said driving-wheel and with said reversing-pinion, and said reversing-pinion with said reversing-wheel, said case and wheels being longitudinally movable with relation to said shaft, each of said wheels having a clutch-chamber in its inner face, a split friction-band located in each of said clutch-chambers, each of said friction-bands being longitudinally movable along said shaft and connected to rotate therewith and provided with a lever to expand it against the side walls of its respective clutch-chamber, a double-ended wedge adapted to operate said levers alternately, and means to hold said wedge from longitudinal movement with relation to said shaft, substantially as described.

F. A. ERRINGTON.

Witnesses:
O. R. VAN VECHTEN,
D. J. WILSON.